United States Patent [19]

DuLong

[11] Patent Number: 4,716,516

[45] Date of Patent: Dec. 29, 1987

[54] MODULAR MACHINE TOOL CONTROLLER

[75] Inventor: Ronald X. DuLong, Sandown, N.H.

[73] Assignee: Dynamics Research Corporation, Wilmington, Mass.

[21] Appl. No.: 654,778

[22] Filed: Sep. 26, 1984

[51] Int. Cl.[4] .............................. G06F 15/00
[52] U.S. Cl. .................... 364/132; 364/474
[58] Field of Search ............... 364/474, 475, 513, 131, 364/132, 133, 134, 135, 136, 167, 168, 169, 171, 172, 200 MS File, 900 MS File; 901/2-5, 9

[56] References Cited

U.S. PATENT DOCUMENTS

| 4,058,711 | 11/1977 | Ondercin | 364/900 |
|---|---|---|---|
| 4,262,336 | 4/1981 | Pritchard | 364/474 |
| 4,321,679 | 3/1982 | Fujie | 364/474 |
| 4,351,025 | 9/1982 | Hall | 364/133 |
| 4,467,436 | 8/1984 | Chance | 364/133 |
| 4,503,507 | 3/1985 | Takeda | 364/131 |
| 4,510,565 | 4/1985 | Dummermuth | 364/167 |
| 4,513,379 | 4/1985 | Wilson | 364/136 |
| 4,514,814 | 4/1985 | Evans | 364/132 |
| 4,550,375 | 10/1985 | Sato | 364/474 |

Primary Examiner—Jerry Smith
Assistant Examiner—Allen MacDonald
Attorney, Agent, or Firm—Weingarten, Schurgin, Gagnebin & Hayes

[57] ABSTRACT

A modular general-purpose machine tool controller having a system processor and a plurality of machine-tool position control elements which receive sensor signals from machine tool transducers and provide servo control signals to the machine tool actuators and servo control motors for control thereof. The number of machine tool axes, or control functions, may be augmented by adding additional position control elements to the machine tool controller as desired. Moreover, the present invention provides independent execution of the desired control positioning function by each of the individual position control boards, avoiding mutual interference or inhibition of the system control processor. The modular machine tool controller incorporates a standardized bus structure and can further expand to include additional elements available for operation thereon. Also, the position control elements of the present invention may be further selectively programmed to be operable as desired for future systems.

3 Claims, 6 Drawing Figures

POSITION CONTROL BOARD

I/O BOARD

MODULAR MACHINE TOOL CONTROLLER

FIELD OF THE INVENTION

The present invention relates to machine tool controllers, and in particular modular computer-controlled machine tool controllers.

BACKGROUND OF THE INVENTION

Early automatic machine tool controllers incorporated a limited number of functions, wherein the operators could quickly and rapidly familiarize themselves and operate the machine tool to its capacity of control in a short time. However, the increasing complexity of the controllers required a corresponding increase in the learning time necessary to operate the equipment. Moreover, each particular machine tool incorporated its own conventions for the functions, such that learning the details of the operational features of each machine is significant for the efficient and accurate machine tool operation. Also, the features and operation of one machine would not necessarily be useful in another machine. As the machine tool controllers incorporated programmable control, the machine tool efficiency and reliability initially suffers due to the increasing complexity and uniqueness of design of each machine tool controller. Further technological change accelerates opportunities for problems to the point that improvements often are offset by system hardware or software errors, as well as detailed operator training.

A standard useful in the machine tool industry is the STD bus format of signal and data transfer, a particular form of computer data transfer. However, the mere application of a computer system incorporating the STD bus to machine tool controllers merely reiterates the above-discussed problems in another form, merely giving the appearance of improved machine tool controller design or ease of operation. Typically, the selection of STD bus-compatible devices, such as listed in the STD Bus Buyers Guide, published by the Ironoak Company of La Jolla, Calif., 1983, provides system control elements wherein the machine tool functions are primarily calculated in the central machine tool controller system processor. Such centralized control of system functions is adequate for small or custom systems, wherein the time necessary for accurate machine tool control is sufficient, or can be compensated for by techniques known in the art. However, modern machine tool controllers are frequently custom-configured according to changing customer requirements. As the number of control functions (axes) increase or the resolution of time or instruction signal is increased, the centralized system control may no longer be adequate for use as the machine tool controller. In such case, redundant central systems, perhaps connected together for coordination of operations, are often required to perform the required machine tool operation. However, such multiple application provides limited consistency in design and reliability in operation. As a result, the advantages gained in coordinated processor machine tool control systems are lost due to development costs and limitations of initial reliability.

SUMMARY OF THE INVENTION

The system according to the present invention comprises a modular machine tool controller wherein the control functions or machine tool position axes are managed by position control and I/O boards, operable in relatively autonomous relationship to a central system control processor, wherein the data is exchanged between the central system processor and each position control board through an STD bus in an asynchronous manner. The system thus is operable to perform a selectable number of control functions, the present invention being expandable to 16 servo control functions. However, no inherent limitation of the number of such functions exists. Each particular control or machine tool axis function comprises an encoder signal received from a machine-tool position encoder providing a position signal corresponding to the actual position of the element thereby controlled, and a control signal transmitted to the appropriate servo control or tool axis actuator, such as a stepping motor, to effect such position control thereof.

The signals of the system position encoder and servo element is communicated to the position control board by an I/O board, having a structure custom-designed to provide (pre)processing of the machine tool signals. For instance, the I/O board includes decoder circuitry to receive signals from incremental position encoders. Similarly, the I/O board provides signals to the actuator, such as a servo amplifier. The I/O board then communicates with the corresponding position control board, which incorporates a microprocessor in combination with appropriate memory and interface circuits to provide a small processing subsystem. The signals received from the machine tool controller system processor are appropriately transformed into a sequence of properly formatted signals to the servo controllers as well as decode the encoded machine tool encoder input signals for accurate machine tool positioning.

It is according to the present invention that the system processor provides a location signal to the position control board, wherein the position control board functions as a memory-mapped device. The particular commands are loaded into a location which appears to be a central processor memory location, wherein the position control board thereafter autonomously executes the individual position commands. The master system control processor is free to provide the subsequent machine tool instruction to the desired axes of machine tool control while each position control board executes the individual position commands. The machine tool system thus formed can be easily, efficiently, cheaply, and simply expanded or modified to accommodate varied particular user applications.

BRIEF DESCRIPTION OF THE DRAWING

These and other features of the present invention will be better understood by reading the following detailed description, taken together with the drawing, wherein.

DETAILED DESCRIPTION OF THE INVENTION

Figure 1:
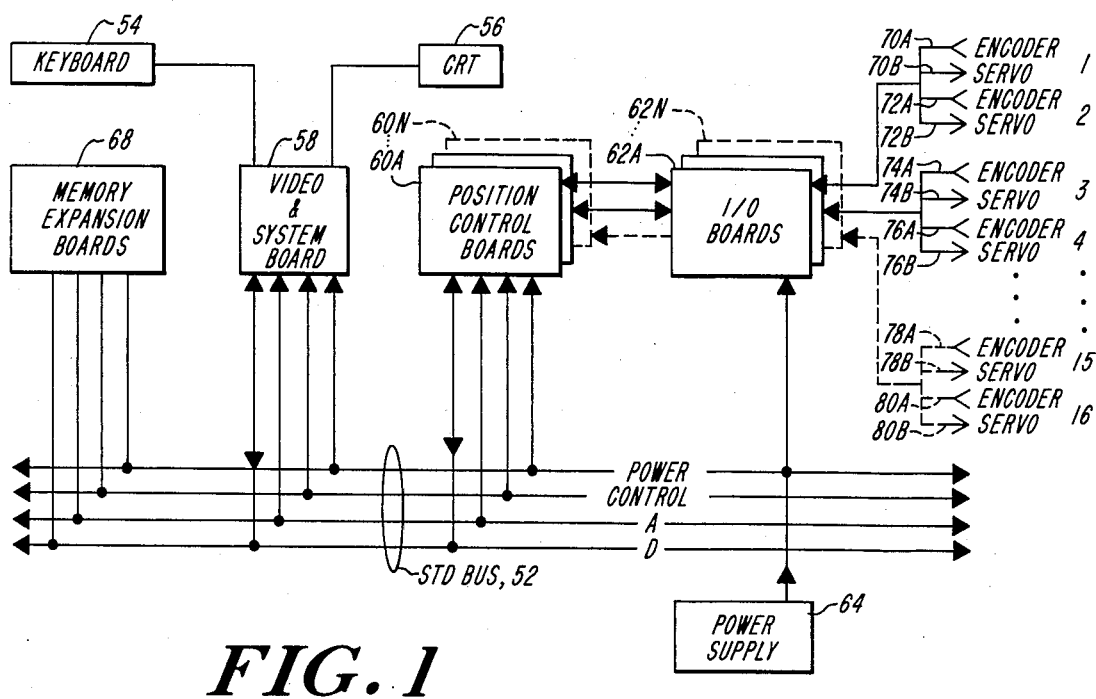
FIG. 1 is a block diagram of one embodiment of the modular machine tool controller of the present invention.

A block diagram of the system according to the present invention 50 is shown in FIG. 1, wherein the elements communicate by an internal data bus 52, comprising the STD bus standards known in the art and not discussed here. Operator system commands are entered by a keyboard 54 and displayed on an associated display 56 operable according to a system contained within the video and system board 58 having an associated memory expansion board 68, wherein the signals are passed over the STD bus 52 having the convention of Table I, below.

TABLE I

| | |
|---|---|
| $D_0$ | Data |
| . | |
| . | |
| . | |
| $D_7$ | |
| $A_0$ | Address |
| . | |
| . | |
| . | |
| $A_{15}$ | |
| | Control |
| RD* | Read Memory or I/O |
| MEMRQ* | Memory Address Select |
| MEMEX | Memory Expansion |
| MCSYNC* | CPU Machine Cycle Sync. |
| STATUS 0* | CPU Status |
| BUSRQ* | Bus Request |
| INTRQ* | Interrupt Request |
| NMIRQ* | Nonmaskable Interrupt |
| PBRESET | Push-Button Reset |
| CNTRL* | AUX Timing |
| PCI | Priority Chain In |
| WR* | Write to Memory or I/O |
| IORQ* | I/O Address Select |
| IOEXP | I/O Expansion |
| REFRESH* | Refesh Timing |
| STATUS 1* | CPU Status |
| BUSAK* | Bus Acknowledge |
| INTAK* | Interrupt Acknowledge |
| WAITRQ* | Wait Request |
| SYSRESET* | System Reset |
| CLOCK* | Clock from Processor |
| PCO | Priority Chain Out |
| | Power |
| AUX PWR | Auxilliary |
| LOGIC PWR | Logic |
| GND | Ground |

*Active Low

The video and system board 58 communicates commands to be executed to the position control boards 60A . . . 60N over the STD bus 52, which position control boards communicate also directly to a corresponding I/O board(s) 62A . . . 62N attached thereto. Each respective I/O board provides and receives signals to the particular axes for machine tool control functions according to encoder input 70A . . . 80A and servo outputs 70B . . . 80B, to the machine tool elements, not discussed here. A power supply 64 provides system power to the various elements over the STD bus 52, as well as to a direct connection to the CRT 56, the connection not shown.

Figure 2:
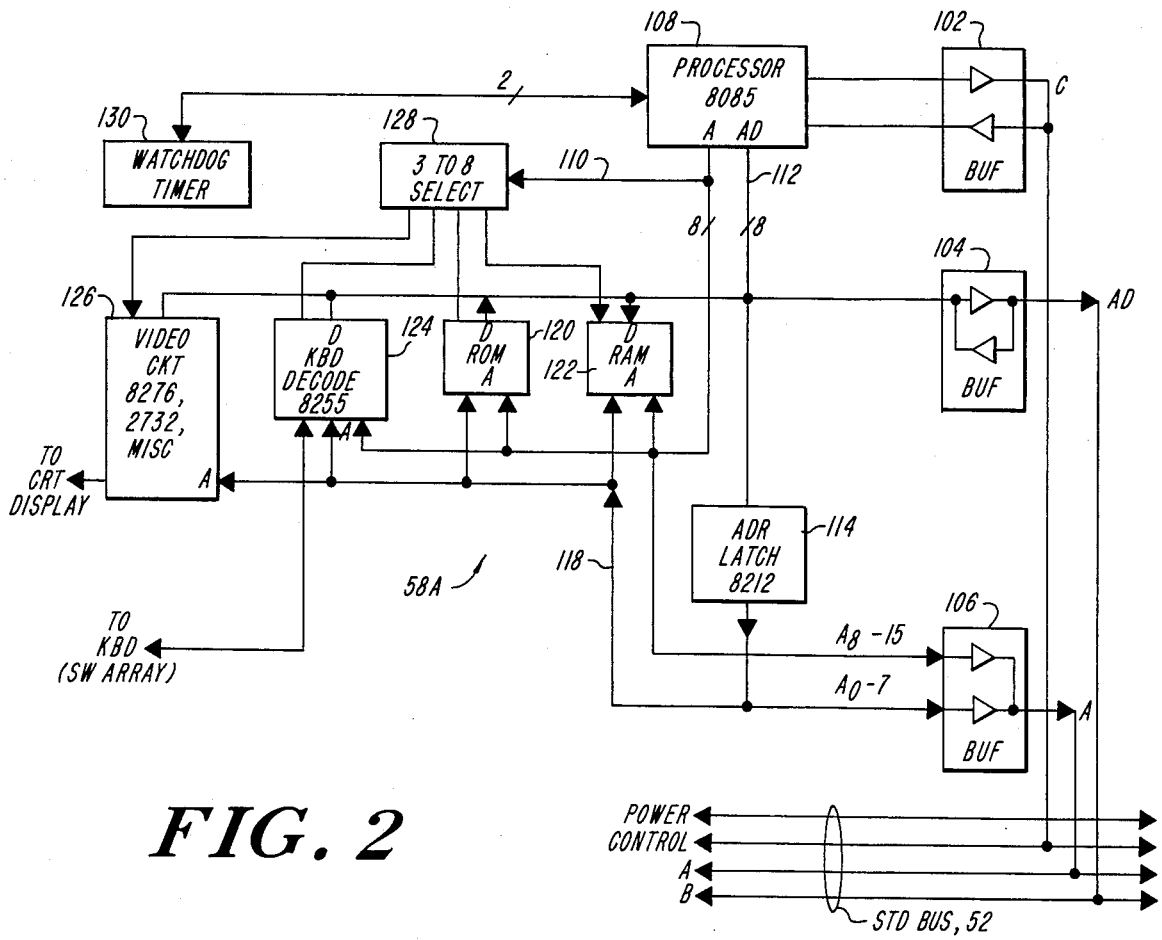
FIG. 2 is a block diagram of the video system board shown in FIG. 1.

A block diagram 58A is shown in FIG. 2, showing the elements of the video and system board 58 of FIG. 1. The video and system board connects to the STD bus 52 through buffer logic 102, 104, and 106, permitting a bidirectional flow of signals between the processor 108 and the STD bus 52. The processor 108 typically comprises a microprocessor, such as an 8085 provided by Intel Corporation of Sunnyvale, Calif., and other manufacturers. The processor 108 provides address and data information over the address leads 110 and the combination address/data leads 112, whereupon the address signals are selectively removed from the signal stream by address latch 114 according to the function provided by Part No. 8212 by Intel Corporation and described in the 8085 reference material, herein incorporated by reference. The latched address signals which result on leads 118, in combination with the byte of address from leads 110, together provide a 16-bit wide address signal, which is applied to the address leads of the STD bus 52 through buffer 106. Moreover, the 16-bit (2 byte wide) address signals are also received by the ROM 120 and RAM 122, providing program control and data storage for the processor 108, according to techniques well known in the art. The operator information is entered by a keyboard (not shown), which typically comprise a matrix of switches, whose condition is determined by a keyboard scan circuit 124, comprising Part No. 8255 by Intel Corporation, operable according to the reference information, herein incorporated by reference. For the particular embodiment provided herein, examples of parameters or flags that are stored in the system memory are Backgauge Dimension, Ram Dimension, Angle, Ram Up Dimension, Delay, Repeat, Angle Adjust, Bend Allow, Inch/Millimeter, Depth/Angle, Backgauge Ram/Backgauge Only, Tool Number, Part Number, Material Thickness, Bench Radius, Die Width, Die Height, Die Radius, Program Number, Number of Steps, Steps Remaining, Parts Count, and Speed Change Point. The above dimensions are stored as either a floating point value, a flag, or directly as an ASCII character.

The video and system board 58A according to the present invention is operable in an interactive manner, which includes a video circuit 126 operable to provide display signals to an external CRT display (not shown), wherein operator information and prompt instructions are provided. The video circuit 126 comprises a video controller element, Intel Part No. 8276, together with associated ROM and other control circuits, such implementation being known and demonstrated according to the associated reference information, herein incorporated by reference. The video and system board block diagram 58A shows that the system data is distributed among the elements 120, 122, 124, and 126, as well as provided to the data leads of the STD bus 52 (through buffer 104) from leads 112 from the processor 108. Since the processor 108 can utilize a single element, such element is activated by a chip or circuit select signal provided from a select decoder 128 receiving an address signal from address leads 110. Moreover, the processor 108 communicates with a watchdog timer 130 which, unless reset, provides a restart signal to the processor 108. If the processor is properly operational, it will reset the watchdog timer 130 indicating that it remains functional. Should the processor 108 enter an illegal or undefined sequence of operation, the watchdog timer will no longer be reset, whereupon the watchdog timer 130 will cause an interrupt to be generated, restarting the processor 108 within the proper programmed sequence.

Figure 3:
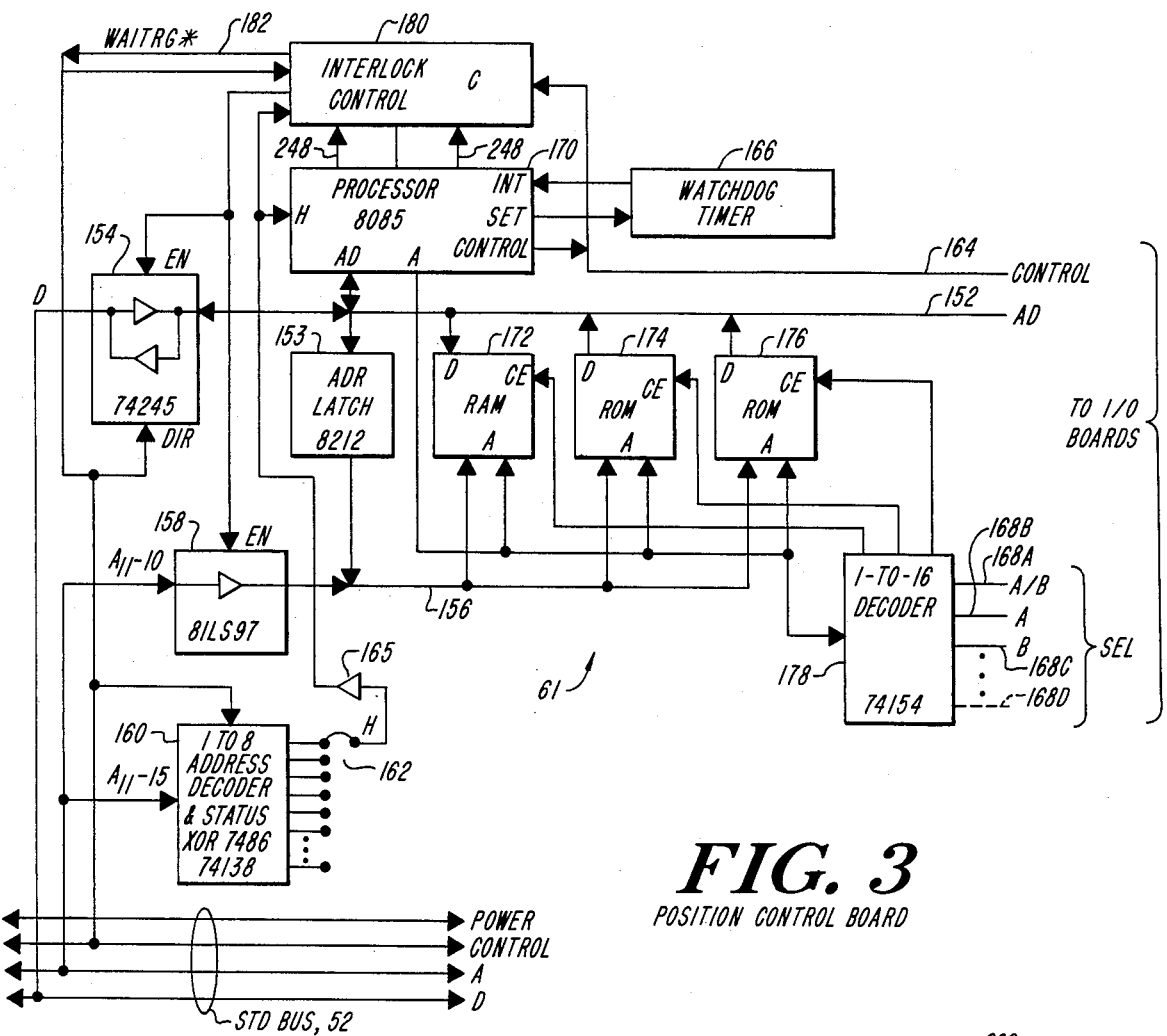
FIG. 3 is a block diagram of the position control board shown in FIG. 1.

A block diagram 61 is shown in FIG. 3, illustrating in more detail one of the position control boards 60A . . . 60N of FIG. 1. Each position control board 61 connects to the STD bus 52, wherein the data signals are received on the internal address and data leads 152 through a bidirectional line driver circuit 154, typically Part No.

74245 manufactured by Texas Instruments, and other manufacturers. System address signals from the STD bus 52 are provided to the position control board address leads 156 through a buffer circuit 158. Signals generated by the video and system board 58 are received by the particular position control board 61 according to an address provided by address signals and decoder circuit 160, as selected by an address strapping option 162, as wired by the user for a particular machine tool control structure, configured as desired. A processor 170 provides address and data signals on leads 152, whereupon the address signals are retained by address latch 153 and selectively transferred to the RAM 172 and ROM 174, 176 elements, each of which receiving and providing data respectively to the AD leads 152.

Processor 170, in conjunction with the program stored within ROM 174 and 176, and data loaded into the RAM 172, comprise a small operating system, operable to control external servo control equipment, as well as reading external encoder input signals to achieve the desired servo position. The externally controlled elements connected through the I/O board of FIG. 4, below, as selectively controlled according to enable signals provided by a select decoder 178, which provides an expanded decoding of the address signal from leads 162 provided by the processor 170. Similarly, data signals are provided to the I/O board over leads 152, as well as control signals by leads 164. A watchdog timer 166 communicates with processor 170 in a manner analogous to the watchdog timer 130 and processor 108 of the video and system board 58, discussed above.

An interlock control circuit 180 provides selective flow of data and address signals to the RAM 172 from either the video and system board 58 (via the STD bus 52) or the processor 170 under master control of the video and system board processor 108 signals sent via the STD bus 52. In particular, the position control board 61 is addressed by the video and system board processor 108 by providing the appropriate signal to cause energization of the lead 163, which causes the processor 170 to go into a hold state. Simultaneously, the interlock control circuit returns a wait signal on lead 182 to the video and system board 58 over the STD bus 52. Moreover, the address and data signals received by the RAM 172 are received from the STD bus 52 by enablement of the buffers 154 and 158 by the interlock control 180. When in the hold condition, the processor 170 provides a high impedance or tri-state condition of its address and AD signals on leads 152 and 162 respectively, permitting the data and address signals to be received from the buffers 154 and 158 without interference. According to the present invention, the video and system board 58 thereafter provides the command to the particular servo element by loading a number or sequence of numbers into memory space within RAM 172 allocated for command signals. The map of the RAM 172 including typical command and flag signals is shown Table II, below.

TABLE II

| Size (Bytes) | Assignment |
|---|---|
| 14 | Position Board Firmware ID |
| 3 | Axis 1 Desired Position |
| 3 | Axis 2 Desired Position |
| 3 | Axis 3 Desired Position |
| 3 | Axis 4 Desired Position |
| 1 | Operation Request |
| 1 | Operation Complete |
| 3 | Axis 1 Actual Position |

TABLE II-continued

| Size (Bytes) | Assignment |
|---|---|
| 3 | Axis 2 Actual Position |
| 3 | Axis 3 Actual Position |
| 3 | Axis 4 Actual Position |
| 1 | Position Board Errors |
| 1 | Axis 1 On Position Flag |
| 1 | Axis 2 On Position Flag |
| 1 | Axis 3 On Position Flag |
| 1 | Axis 4 On Position Flag |
| 2 | Ram Depth Desired Position |
| 2 | Ram Up Desired Position |
| 2 | Ram Speed Change Position |
| 1 | Repeat Moves |
| 2 | Delay Timer |
| 1 | Slow Slew Flag |
| 3 | Variable Calibrate Point |
| 1 | Short Timer #1 |
| 1 | Short Timer #2 |
| 1 | Long Timer #1 |
| 1 | Ram Complete Flag |
| 1 | Long Timer Flag |
| 1 | Calibrate Complete Axis 1 Flag |
| 1 | Calibrate Complete Axis 2 Flag |
| 1 | Calibrate Complete Axis 3 Flag |
| 1 | Calibration In-Process Flag |
| 1 | Move Complete Flag |
| 1 | Ram Slow Speed Flag |
| 1 | Disable Flag |
| 1 | Backgauge Only Flag |

When the video and system board 58 returns operation of the position control board 61 processor 170 by removing the enable signal from lead 163 by changing the address on the STD bus 52, the buffers 154 and 158 are no longer enabled, thereby allowing the processor 170 of the position control board 61 to return to autonomous operation, as defined by the program in local ROM memory.

The processor 170 reads the new data loaded in the RAM 172, whereafter such data is processed according to the execution of programs stored in ROM 174, providing data signals over leads 152 to the I/O board 63 of FIG. 4, discussed below. Moreover, the particular encoder and/or input or output operation to be performed is indicated and controlled by signals on leads 168A, 168B, and 168C, provided by decoder circuit 178.

Figure 4:
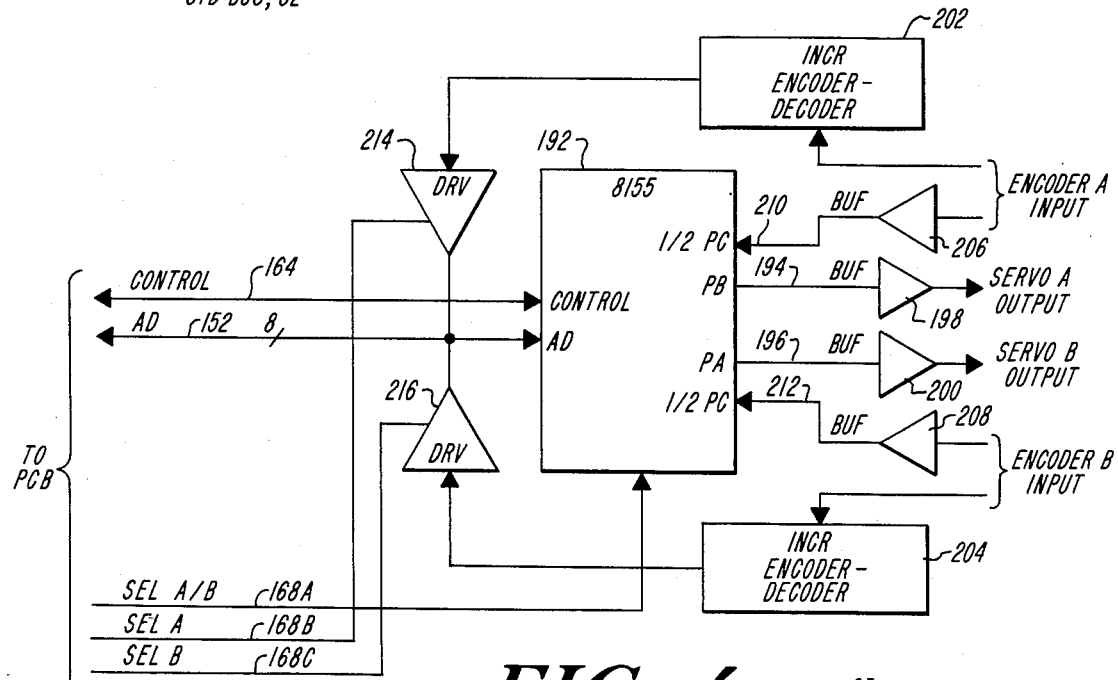
FIG. 4 is a block diagram of the I/O board, which communicates with the position control board and is shown in FIG. 1.

A block diagram of the I/O board 63 is shown in FIG. 4, whereupon data signals are received over leads 152 from the position control board 61, discussed above. The signals are received by a RAM and port expander circuit 192, typically Part No. 8155 manufactured by Intel Corporation. Outgoing signals to servo motors are provided by port A and port B output signals 194 and 196 of circuit 192, and are isolated by buffers 198 and 200 to provide signals of the appropriate amplitude as necessary for the respective servo motor controls. Encoded position signals are received by incremental encoder/decoder circuits 202 and 204, each of two axes, as well as flag signals from the equipment through buffers 206 and 208, which are then received by circuit 192, port C inputs at 210 and 212. The decoded incremental encoder signals from decoders 202 and 204 are selectively placed on the AD leads 152 by selected energization of line drivers 214 and 216, according to activation of selected leads 168B and 168C. Similarly, the encoder signals provided on leads 210, 212 received by port C of circuit 192 are received on leads 152 by appropriate energization of control leads 164 and select A/B signal on lead 168A. Data outgoing from the position control board to the servo motor is placed at the circuit 192 port B and port A according to energization of the control lead 164, and a particular select signal on lead 168A. The particular format of the control signals may be modified to accommodate the particular format of the position encoders and servo motors used.

Figure 5:
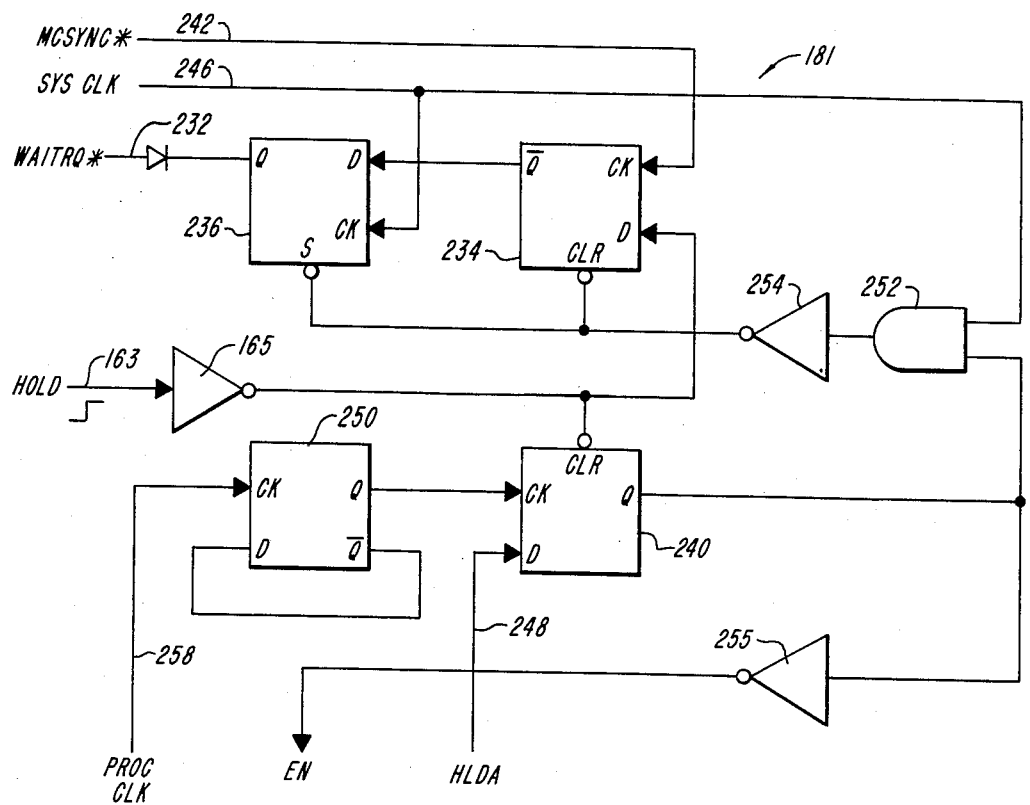
FIG. 5 is a circuit diagram showing the interlock control included in the position control board of FIG. 3.

A schematic diagram of the interlock control 181 for the interlock 180 of position control board 61 is shown in FIG. 5. When the particular position control board 61 is selected, determined by the activation of signals on lead 163 according to strapping option 162 of FIG. 3, a signal is generated which places the processor 108 of the video and system board 58 into a WAIT state. The WAITRQ* state on lead 232 is produced by the signal on lead 163, is inverted by the inverter 165, and subsequently received by flip-flops 234 and 236, which delay the hold signal by the generation of a MCSYNC* signal and a system CLOCK signal, respectively, from the STD bus 52 (Table I). Therefore, upon the selection of the particular position control board 61 so addressed produces a WAITRQ* signal on lead 232 as part of the control portion of the STD bus 52 (Table I) to place the video and system board 58 in a wait or not ready state.

Simultaneously, the processor 170 of the position control board 61 receives the hold signal from the inverter 165, and the flip-flop 240 Q output is reset to a logical low. Buffers 154 and 158 are enabled by the flip-flop 240 logical high output signal after being inverted by inverter 255, to permit data to be exchanged between video and system board 58 and a position control board (60A ... 60N) according to the data format of Table II after the WAITRQ* signal is cleared. When the current processor 170 instruction cycle is finished, the processor 170, receiving a hold signal from the inverter 165, produces a hold acknowledge signal in response thereto on lead 248, which is received by the D input of the flip-flop 240 to produce a logical low signal at the Q output. The signal timed through 234 and 236 releases or clears the WAITRQ* and allows data transfer between boards. A flip-flop 240 clock signal is received from the processor 170 on lead 258, and is delayed one cycle by flip-flop 250. However, as long as the position control 61 is receiving data from the video and system board, which is accomplished while the hold signal exists on lead 163, the flip-flop 240 remains in a clear state, and the hold acknowledge signal is not propagated to flip-flop 240. However, once the data is completely transferred between the position control board and the video and system board 58 (or vice versa), the hold signal is released. When this signal is removed, the processor 108 of the video and system board 58, as well as the processor 170 of the position control board 61, returns to autonomous operation.

According to standard STD bus operations, both address and processor operation code signals appear on the STD bus. The position control board 61 address decoder 160 includes exclusive OR gates which receive the STATUS 0* and STATUS 1* signals (Table I) to inhibit operation of the address decoder (Part No. 74138), except when the position control board is addressed. Moreover, the STATUS 0* signal serves to indicate the direction of the data flow between the video and system board 58A and the addressed position control board 61.

Figure 6:
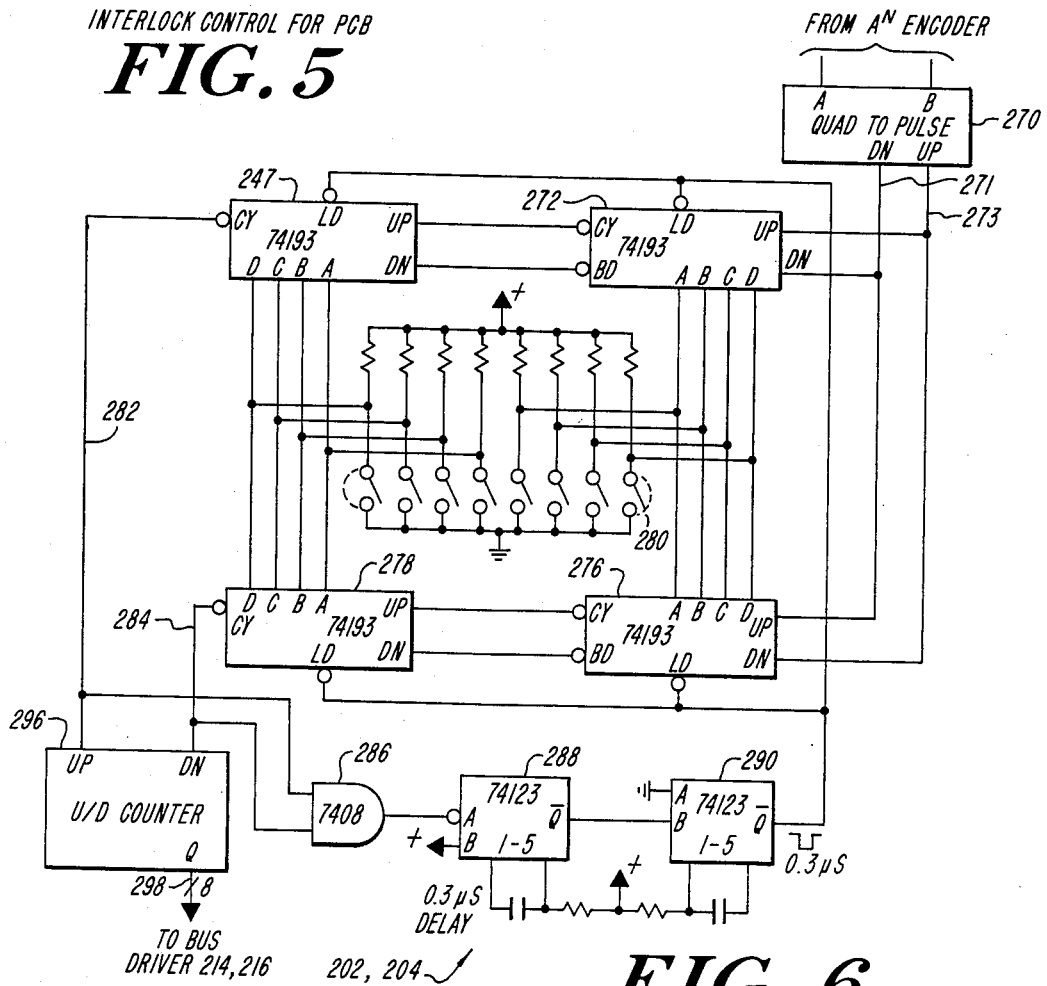
FIG. 6 is a detailed schematic of the incremental encoder-decoder of FIG. 4.

The detailed schematic diagram of the incremental encoder-decoder 202 and 204 of FIG. 4 is shown in detail in FIG. 6. The quadrature A and B input signals from either machine tool encoder received by each I/O board 62A ... 62N is received by a quadrature signal to pulse signal converter 270, whereupon the direction of machine tool movement is determined by the quadrature relationship of the pulses received at inputs A and B, producing either a pulse sequence at the down output on lead 271 or the up output on lead 273 from the converter 270. According to the present invention, the I/O board 63 of FIG. 4 may be configured to accomodate a variety of different encoder signals or encoders having a variety of resolutions. The change in encoder signal often appears as variation in the number of pulses per given distance traversed. Therefore, the incremental encoder-decoder circuit of FIG. 6 includes a counter providing division by a selectable value, typically between 2 and 256 in the present embodiment, whereupon the encoder signals received by the converter 270 are normalized by a selected divide value before being received by the system processor 58A of FIG. 2. According to the present invention, the counter of FIG. 6 provides an eight-bit parallel direction signal on lead 298 to the bus drivers 214 or 216 of FIG. 4, corresponding to a sequence of pulses received from the incremental encoder through the quadrature to pulse converter 270.

For example, if the decoder of FIG. 6 is intended to provide a scaling of position increment signals at leads 298 of one increment for every one hundred encoder pulses received at the quadrature to pulse converter 270, a number one hundred would be entered into the counters 272-278 via switches 280 after a carry signal is produced on leads 282 and 284. Intervening bidirectional (up/down) counters 272, 274, 276 and 278, which provide the scaling, are connected to simultaneously count in opposite directions, whereupon a carry signal is produced on leads 282 or 284 whenever the number of pulse increments from the encoder, through the quadrature pulse converter 270 exceeds the number preloaded into the counters 272-278 without losing the count sequence when the motion of the machine tool is reversed. If the machine tool element continues in the same direction, subsequent pulses are received by the counters 272-278 such that either counters 272 and 274 or 276 and 278 produce a carry signal on leads 282 or 284 when the respective counters count from the number loaded through 255 (for an eight-bit counter) counters 272 and 274 are operable to produce a carry signal on lead 282 when a sequence of up signals is received from the quadrature to pulse converter 270. The counters 272 and 274 produce no signal at lead 282 cause the counters 272, 274 to decrement through zero. Similarly, counters 276 and 278 are configured to produce a carry signal on lead 284 when a sequence of down pulses from quadrature to pulse converter 270 cause the counters 276 and 278 to increment from the number loaded through 255. The counters 276 and 278 produce no carry signal when the counters 276 and 278 are decremented through zero.

According to the present invention, only the carry signals from counters 274 and 278 are used which are combined by AND gate 286 and converted to a delayed pulse by one-shot flip-flops 288 and 290, and cause both pair of counters 272, 274 and 276, 278 to be loaded with the number from switches 280. Moreover, the counter pairs are connected to count in opposite directions, whereupon a division is produced according to the number entered into switches 280, regardless of the modulous of the counter pairs used. Accordingly, if the machine tool counts for a count of twenty pulses past the previous carry out (reload) and then reverses direction, the next twenty pulses will decrement the counters to the condition at which the number from switches 280 was loaded, but cause the other counter pair to continue counting (incrementing) until the number of additional counts equal to the number entered by switches 280 has been reached. At that time, a carry signal is generated, incrementing or decrementing the up/down position counter 296. Since only the carry out signals of counter 274 and 278 are used to increment or decrement counter 296, the borrow signals produced when the counters 274 and 278 decrement through zero, which cannot be used, are ignored. Moreover, the absence of a counter 274 or 278 carry-out signal as the count proceeds through zero provides desirable hysteresis for eliminating erratic signals common to high resolution instruments in harsh mechanical environments.

Modifications and substitutions made by one skilled in the art are considered within the scope of the present invention. Therefore, the present invention is not to be limited except by the claims which follow.

I claim:

1. A modular machine tool controller, comprising:
   means for receiving and storing user commands and providing control instructions;
   position control means for receiving said control instructions and providing position signals to said machine tool and having an instruction cycle; and
   data transfer means for selectively providing block control instruction transfer between said means for receiving and said position control means, wherein said position control means is operable according to a predetermined address to temporarily inhibit said means for receiving until said position control instruction cycle is complete and thereafter permitting operation of said data transfer means, additional position control means are operable at a corresponding address, said additional position control means also receiving control instructions on said data transfer means and having a different corresponding address,
   said additional position control means includes:
      a processor;
      processor interrupt means; and
      control instruction input means, and wherein
   upon completion of the position control cycles, said processor interrupt means is operative to inhibit operation of said processor and to cause new control instructions to be received by said control instruction input means, whereupon said processor is released to provide position signals according to said control instructions in said control instruction input means.

2. The modular machine tool controller of claim 1, wherein
   said processor interrupt means produce a control inhibit signal when control instructions are being loaded into said control instruction input means;
   said means for receiving is placed in a wait state upon receipt of said control inhibit signal.

3. A method of machine tool control with command processor and position control processor means including the steps of:
   a. entering new data;
   b. calculating command data in the command processor from the new data;
   c. addressing the position control processor from the command processor;
   d. inhibiting a transfer of command data to the position control processor until the position control processor completes a current instruction cycle;
   e. stopping the position control processor in response to the addressing and the completion of the current instruction cycle;
   f. sending said command data over a data bus from the command processor;
   g. receiving command data from said data bus by the positions control processor;
   h. releasing the position control processor;
   i. calculating new command data in the command processor; and
   j. repeating steps c through i above until data is executed.

* * * * *